United States Patent
Kim et al.

(10) Patent No.: US 9,032,463 B2
(45) Date of Patent: May 12, 2015

(54) APPARATUS AND METHOD FOR PROVIDING BROADCAST CONTENTS IN INTERNET BROADCAST SYSTEM

(75) Inventors: Jun-Hyung Kim, Suwon-si (KR); Bo-Sun Jung, Seongnam-si (KR); Sang-Hyuk Lee, Gunpo-si (KR); Ji-Eun Keum, Suwon-si (KR); Jong-Hyo Lee, Pyeongtaek-si (KR); Sung-Oh Hwang, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 411 days.

(21) Appl. No.: 12/431,419

(22) Filed: Apr. 28, 2009

(65) Prior Publication Data
US 2009/0271837 A1    Oct. 29, 2009

(30) Foreign Application Priority Data
Apr. 28, 2008    (KR) .................. 10-2008-0039543

(51) Int. Cl.
| | |
|---|---|
| *H04N 7/173* | (2011.01) |
| *H04N 21/41* | (2011.01) |
| *H04N 21/45* | (2011.01) |
| *H04N 21/466* | (2011.01) |
| *H04N 21/482* | (2011.01) |
| *H04N 21/61* | (2011.01) |

(52) U.S. Cl.
CPC ....... *H04N 7/17318* (2013.01); *H04N 21/4126* (2013.01); *H04N 21/4532* (2013.01); *H04N 21/4668* (2013.01); *H04N 21/4821* (2013.01); *H04N 21/6125* (2013.01)

(58) Field of Classification Search
None
See application file for complete search history.

(56) References Cited

U.S. PATENT DOCUMENTS

| | | | | |
|---|---|---|---|---|
| 7,027,460 | B2* | 4/2006 | Iyer et al. | 370/429 |
| 7,587,731 | B1* | 9/2009 | Oyabu et al. | 725/46 |
| 2002/0133821 | A1* | 9/2002 | Shteyn | 725/46 |
| 2003/0146940 | A1 | 8/2003 | Ellis et al. | |
| 2003/0149978 | A1 | 8/2003 | Plotnick | |
| 2004/0237104 | A1* | 11/2004 | Cooper et al. | 725/38 |
| 2005/0246747 | A1 | 11/2005 | Braun et al. | |
| 2006/0117349 | A1* | 6/2006 | Ruhl | 725/46 |
| 2007/0067807 | A1 | 3/2007 | O'Neil | |

(Continued)

FOREIGN PATENT DOCUMENTS

| | | |
|---|---|---|
| EP | 1 494 375 | 1/2005 |
| EP | 1 608 173 | 12/2005 |

(Continued)

*Primary Examiner* — Cai Chen
(74) *Attorney, Agent, or Firm* — The Farrell Law Firm, P.C.

(57) ABSTRACT

A method and apparatus for providing content in a broadcast system is provided. Upon receipt of a request for synchronization from a mobile terminal, a set-top box creates a recommended content list based on user information received from the mobile terminal and delivers the recommended content list to the mobile terminal. The set-top box receives from the mobile terminal a content list, selected from the recommended content list and included in a Personal Information Management System (PIMS) updated using the recommended content list. The set-top box determines whether a user of the mobile terminal intends to view content from the received content list at a start time of the content. Upon receipt of view acceptance information from the mobile terminal, the set-top box sends a request for the content to a service provider at the start time, receives the requested content from the service provider, and provides the received content to the mobile terminal.

14 Claims, 12 Drawing Sheets

(56) References Cited

U.S. PATENT DOCUMENTS

| | | | |
|---|---|---|---|
| 2007/0157240 A1 | 7/2007 | Walker | |
| 2007/0260604 A1* | 11/2007 | Haeuser et al. | 707/9 |
| 2008/0022298 A1 | 1/2008 | Cavicchia | |
| 2012/0148217 A1 | 6/2012 | Ellis et al. | |

FOREIGN PATENT DOCUMENTS

| | | |
|---|---|---|
| JP | 2001-045460 | 2/2001 |
| JP | 2002-530969 | 9/2002 |
| JP | 2003-198978 | 7/2003 |
| JP | 2005-510143 | 4/2005 |
| JP | 2005-522922 | 7/2005 |
| JP | 2006-246064 | 9/2006 |
| JP | 2007-281841 | 10/2007 |
| WO | WO 03/043326 | 5/2003 |
| WO | WO 2008/042281 | 4/2008 |

\* cited by examiner

PIMS 501

| | MON | TUE | WEN | THU | FRI | SAT |
|---|---|---|---|---|---|---|
| 09:00 | LECTURE | | LECTURE | | | TRAVEL |
| 12:00 | | | | | | |
| 13:00 | LECTURE | LECTURE | | LECTURE | | |
| 15:00 | LECTURE | | LECTURE | LECTURE | | |
| 17:00 | | LECTURE | | | LECTURE | |
| 19:00 | | LECTURE | PART-TIME JOB | PART-TIME JOB | | |

FIG.5A

RECOMMENDED CONTENT LIST 502

| | MON | TUE | WEN | THU | FRI | SAT |
|---|---|---|---|---|---|---|
| 09:00 | | | | | | |
| 12:00 | ☐ ANIMATION | ☐ WORLD NEWS | ☐ MOVIE | ☐ COMEDY | | ☐ TRAVEL INFO |
| 13:00 | | | ☐ MOVIE | | ☐ DRAMA | ☐ ROAD MOVIE |
| 15:00 | | ☐ STAR LEAGUE | | | ☐ DRAMA | |
| 17:00 | | | ☐ ENGLISH CONVERSATION | ☐ ENGLISH CONVERSATION | | |
| 19:00 | | | | | | |

FIG.5B

UPDATED PIMS

| | MON | TUE | WEN | THU | FRI | SAT |
|---|---|---|---|---|---|---|
| 09:00 | LECTURE | | LECTURE | | | TRAVEL |
| 12:00 | | ☺ WORLD NEWS | ☺ MOVIE | ☺ COMEDY | | ☺ TRAVEL INFO |
| 13:00 | LECTURE | LECTURE | ☺ MOVIE | LECTURE | ☺ DRAMA | ☺ ROAD MOVIE |
| 15:00 | LECTURE | | LECTURE | LECTURE | ☺ DRAMA | |
| 17:00 | | LECTURE | ☺ ENGLISH CONVERSATION | ☺ ENGLISH CONVERSATION | LECTURE | |
| 19:00 | | LECTURE | PART-TIME JOB | PART-TIME JOB | | |

APPARATUS AND METHOD FOR PROVIDING BROADCAST CONTENTS IN INTERNET BROADCAST SYSTEM

PRIORITY

This application claims priority under 35 U.S.C. §119(a) to a Korean Patent Application filed in the Korean Intellectual Property Office on Apr. 28, 2008 and assigned Serial No. 10-2008-0039543, the entire disclosure of which is incorporated herein by reference.

BACKGROUND OF THE INVENTION

1. Field of the Invention

The present invention relates generally to an apparatus and method for providing broadcast content in a broadcast system. More particularly, the present invention relates to an apparatus and method for providing broadcast content in an Internet broadcast system supporting Internet Protocol Television (IPTV) services.

2. Description of the Related Art

In the era of Internet Protocol (IP)-based convergence, the convergence of broadcasting and communication has become a new business model, which has high marketability and attracts attention as a next-generation market leading technology. In particular, IPTV technology, which is the principal axis of the broadcasting-communication convergence, is a technology that not only provides services designed by remixing or combining pre-existing TeleVision (TV), voice, and data technologies into one technology, but IPTV technology also supports interactivity of these services, enabling creation of various business models and services. Unlike the conventional technology, which provides specialized services in existing environments where the types of serviceable terminals are limited, IPTV technology may provide services to all types of fixed terminals (e.g., set-top boxes, Personal Computers, TVs, etc.), mobile terminals (e.g., mobile phones, Personal Digital Assistants (PDAs), etc.), and wired/wireless networks, making it possible to offer and apply the same services in various environments and to develop a variety of new services by considering diverse environments.

FIG. 1 illustrates an entire domain and a value chain related to IPTV.

Referring to FIG. 1, the entire domain related to IPTV includes a consumer domain 101, a network provider domain 102, a platform provider domain 103, an IPTV service provider domain 104, and a content provider domain 105 in order to offer IPTV services to a user 100.

The consumer domain 101, a domain consuming IPTV services, may be composed of at least one terminal for receiving and consuming services, and a network (e.g., a home network) consisting of several terminals. The terminals may include not only a set-top box, but also portable terminals supporting wireless environments, including a mobile phones and PDAs.

The network provider domain 102 connects the user 100 to a platform or a service provider, and delivers various types of services and content. A transmission system of the network provider domain 102 may support diverse wired/wireless and broadcast transmission technologies, and is commonly made up of an access network and a core or backbone network.

The platform provider domain 103, a domain for providing common services to an IPTV service provider, provides user authentication, charging, or other similar services to the IPTV service provider.

The IPTV service provider domain 104, a domain for providing IPTV services to the consumer domain 101, receives content provided from a content provider and packages the content into a service.

The content provider domain 105 is a domain that stores content or content assets and also holds the copyrights thereof. Various IPTV services as well as scheduled content services and content-on-demand services may be provided in the above-described five domains 101 through 105, and four units 106-109 gather and constitute one value chain to provide such services, which are described as follows.

First, a content production unit 109, situated in the content provider domain 105, produces and edits the content. A content aggregation unit 108, situated in the IPTV service provider domain 104, receives content provided from various content providers and aggregating the received content into diverse services. A content delivery unit 107, which accesses both the platform provider domain 103 and the network provider domain 102, delivers the aggregated content provided from the IPTV service provider to the consumer domain 101. In addition, a content reconstitution unit 106, situated in the consumer domain 101, converts the provided content into a format viewable by a user.

IPTV services can be classified into a managed model and an unmanaged model (Open Internet) according to their respective Quality of Service (QoS) provisioning. In the managed model, the service provider operates the platform provider domain 103, the network provider domain 102, and the IPTV service provider domain 104 in an integrated manner. In the unmanaged model, as the service provider and the network provider are separated, the service provider manages the IPTV service provider domain 104, while other network providers (i.e., the network provider domain 102 and the platform provider domain 103) manage content delivery.

FIG. 2 is a flow diagram illustrating a conventional content providing method.

A role of a service provider 201 can be described separately for a managed model and an unmanaged model. However, for convenience, the unmanaged model is not shown. A content provider 200 creates content and detailed information for the content (hereinafter referred to as "content information") in step 204, and delivers the created content and content information to the service provider 201 in step 205.

Upon receiving the content and content information, the service provider 201 creates an Electronic Program Guide (EPG) based on the delivered content and content information in step 206. The EPG provides detailed information, a purchase method, an access method, etc., for the services and content provided by the service provider 201.

In step 207, the service provider 201 delivers the EPG to a set-top box 202. In step 208, the set-top box 202 receives the delivered EPG, processes the received EPG, and provides the processed information to a TV (or display) 203. Then, the TV 203 displays the EPG according to the received processed information.

A user 100 selects desired content using the EPG displayed on the TV 203 in step 209, and the TV 203 sends a Receive Request message for the selected content to the service provider 201 via the set-top box 202 in step 210.

In step 211, the selected content is delivered to the user 100. Here, the content can be provided in various ways according to a policy of the service provider. For example, the service provider 201 may deliver the content stored therein or deliver the content received from the content provider 200 according to a service policy of the service provider 201. A transmission mode and a content type can also be classified into, for example, streaming/downloading modes and real-time/non-real-time types. The received content is displayed on the TV 203 in step 212.

The user may have difficulty in choosing a desired channel, because many types of services can be provided using IPTV. In addition, when a user intends to view IPTV content during an outing, the user must inconveniently check a schedule and personally store, in advance, the desired content during an available time, in a mobile terminal. Therefore, there is a need for a method and apparatus that provides a user with content in accordance with the user's personal tastes, viewing patterns, and schedule (hereinafter referred to as "user information"), without intervention of the user.

SUMMARY OF THE INVENTION

The present invention has been made to address at least the above problems and/or disadvantages and to provide at least the advantages described below. Accordingly, an aspect of the present invention provides a service providing method and apparatus for delivering recommended content to a mobile terminal of a user in a time the user can view IPTV, using user information in an IPTV system so that the user may view the IPTV content even in an outdoor environment without a separate procedure.

According to one aspect of the present invention, a method is provided for providing content in a broadcast system. Upon receipt of a request for synchronization from a mobile terminal, a set-top box creates a recommended content list based on user information received from the mobile terminal and delivers the recommended content list to the mobile terminal. The set-top box receives from the mobile terminal a content list, selected from the recommended content list and included in a Personal Information Management System (PIMS) updated using the recommended content list. The set-top box determines whether a user of the mobile terminal intends to view content from the received content list at a start time of the content. Upon receipt of view acceptance information from the mobile terminal, the set-top box sends a request for the content to a service provider at the start time, receives the requested content from the service provider, and provides the received content to the mobile terminal.

According to another aspect of the present invention, a method is provided for providing content in a broadcast system. A mobile terminal sends a request for synchronization to a set-top box at the request of a user. The mobile terminal receives a recommended content list created based on user information from the set-top box, and updates a Personal Information Management System (PIMS) using the recommended content list. The mobile terminal delivers a content list, selected from the recommended content list and included in the updated PIMS to the set-top box. The mobile terminal receives a view inquiry message for content from the content list, from the set-top box at a start time of the content, and delivers information to the set-top box indicating whether the user intends to view the content. The mobile terminal receives the content provided from a service provider according to whether the user intends to view the content.

According to a further aspect of the present invention, an apparatus is provided for providing content in a broadcast system. Upon receipt of a request for synchronization from a mobile terminal, a set-top box creates a recommended content list based on user information received from the mobile terminal, delivers the recommended content list to the mobile terminal, receives from the mobile terminal a content list, selected from the recommended content list and included in a Personal Information Management System (PIMS), determines whether a user of the mobile terminal intends to view content from the received content list at a start time of the content, and sends a request for the content to a service provider at the start time when the user accepts viewing of the content. The service provider provides the corresponding content.

According to an additional aspect of the present invention, an apparatus is provided for providing content in a broadcast system. A Personal Information Management System (PIMS) management unit receives a recommended content list created based on user information from a set-top box and updates a PIMS using the recommended content list, after sending a request for synchronization to the set-top box at a request of a user. An application driving unit receives a view inquiry message for content from a content list, selected from the recommended content list and included in the updated PIMS, from the set-top box, at a start time of the content. A synchronization processing unit delivers the content list to the set-top box, delivers information indicating whether the user intends to view the content, to the set-top box with respect to the view inquiry message, and receives the content provided from the service provider according to whether the user intends to view the content.

BRIEF DESCRIPTION OF THE DRAWINGS

The above and other aspects, features and advantages of the present invention will be more apparent from the following description when taken in conjunction with the accompanying drawings, in which:

FIGS. 5A to 5C are diagrams illustrating a change in PIMS according to an embodiment of the present invention;

FIG. 6 is a block diagram of a set-top box for providing broadcast content in an IPTV system according to an embodiment of the present invention;

DETAILED DESCRIPTION OF THE PREFERRED EMBODIMENTS

Preferred embodiments of the present invention are described in detail with reference to the accompanying drawings. The same or similar components may be designated by the same or similar references numerals although they are illustrated in different drawings. Detailed descriptions of constructions or processes known in the art may be omitted to avoid obscuring the subject matter of the present invention. The terms and words used in the following description and claims are not limited to the dictionary meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

It is to be understood that the singular forms "a", "an", and "the" include plural referents unless the context clearly dictates otherwise. For example, "a component surface" refers to one or more of such surfaces.

Although names of entities defined in $3^{rd}$ Generation Partnership Project (3GPP) or Open IPTV Forum (OIF) will be used herein for convenience, they are not intended to limit the scope of the present invention, and the invention can be applied to any system having similar technical background.

An IPTV system can provide a great variety of channels using an IP network. However, a user may have difficulty in scanning and selecting desired channels because of the large number of services types the IPTV system can provide. In addition, when a user intends to view IPTV content during an outing, the user may inconveniently be required to check a schedule and personally store, in advance, the desired content at an available time, in a mobile terminal. Therefore, the present invention provides a method and apparatus in which an IPTV system analyzes user information, automatically checks a user's schedule depending on the analysis results, and delivers recommended content to a mobile terminal at a time when the user can view IPTV content.

Figure 1:
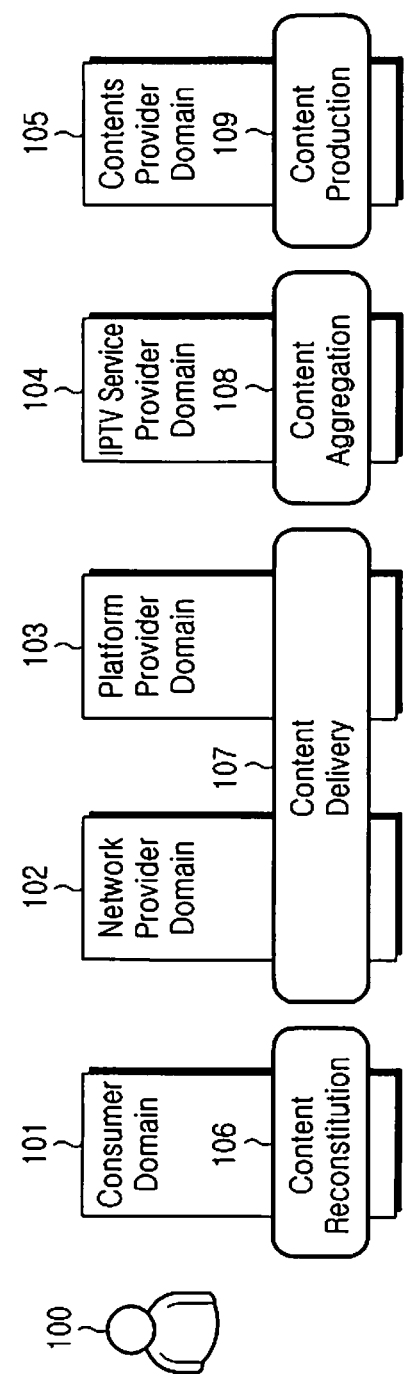
FIG. 1 is a diagram illustrating an entire domain and a value chain related to IPTV.
Figure 2:
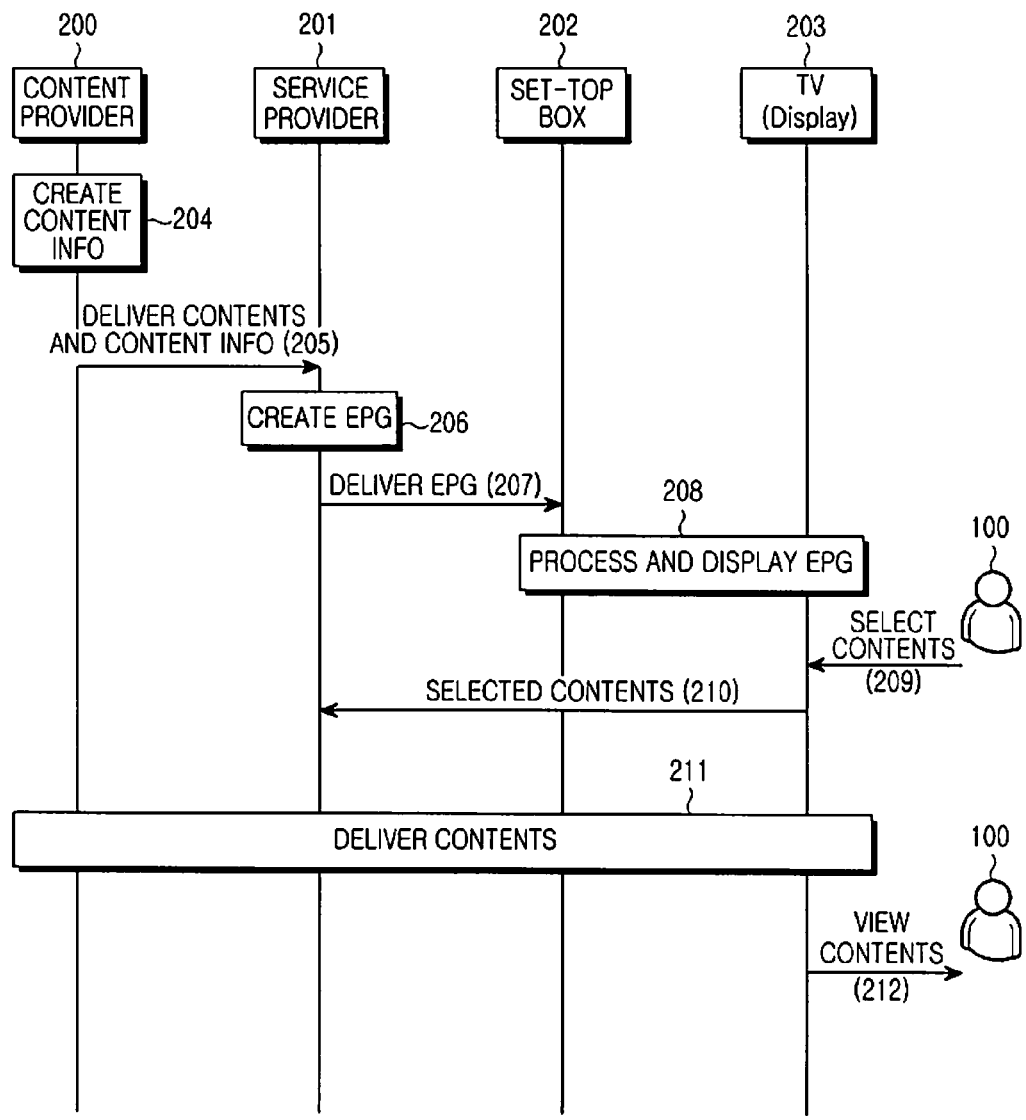
FIG. 2 is a flow diagram illustrating a conventional content providing method.
Figure 3:
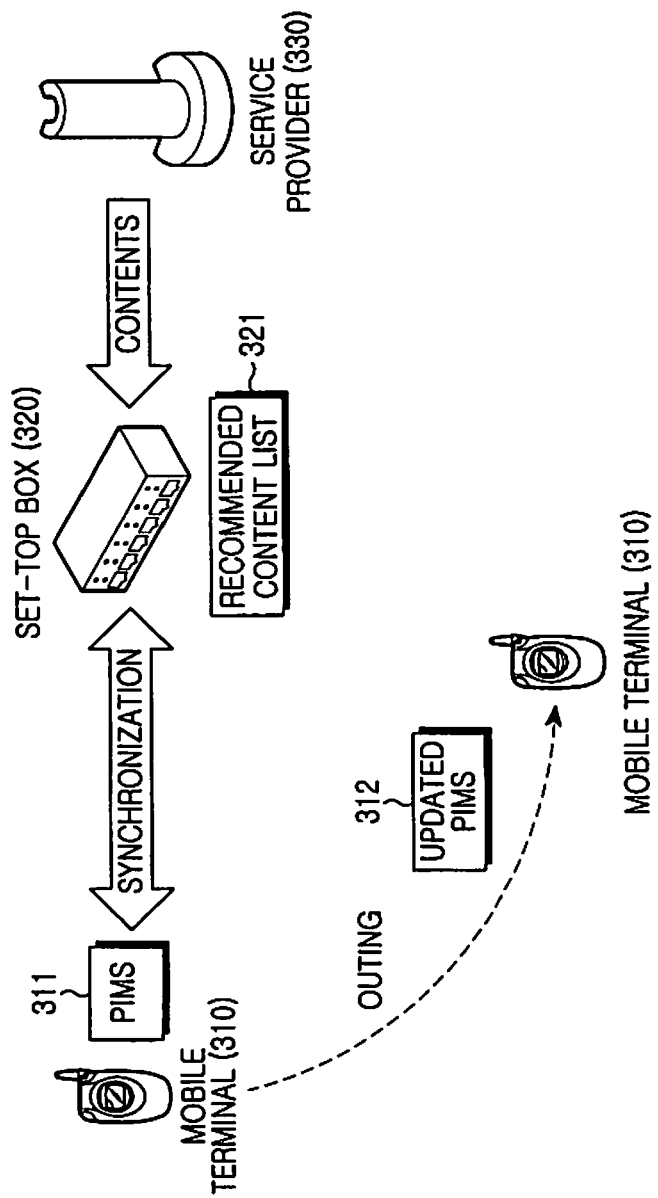
FIG. 3 is a diagram illustrating an operation of an IPTV system according to an embodiment of the present invention.

FIG. 3 is a diagram illustrating an operation of an IPTV system according to an embodiment of the present invention.

An IPTV system according to an embodiment of the present invention includes a mobile terminal 310, a set-top box 320, and a service provider 330.

The mobile terminal 310, a user-dedicated device with an IPTV function, can receive IPTV services over a public network not in both indoor and outdoor environments. That is, the mobile terminal 310 is an Open IPTV Terminal Function (OITF) having mobility, and provides a Personal Information Management System (PIMS) 311 to use IPTV services. PIMSs are well known in the art, and therefore a detailed description thereof is not included herein.

After receiving the PIMS 311 from a user, the mobile terminal 310 performs synchronization with the set-top box 320 at a user's home. The term "synchronization," as used herein, refers to a general procedure for data-synchronizing a portable device or a storage device of a user to a server, i.e., synchronization refers to a process in which two entities exchange data to share information and maintain consistency. In the present invention, information shared to maintain consistency may be extended to include PIMS, a content list, content, and a content log. For convenience, a description of a synchronization method between two devices is omitted.

Information of the PIMS 311 received from the user during the synchronization is delivered to the set-top box 320, and the set-top box 320 checks previously gathered user information. Further, the set-top box 320 creates a recommended content list 321 suitable for the user among the content in an EPG provided from the service provider 330.

Moreover, the set-top box 320 synchronizes the recommended content list 321 with the mobile terminal 310 and delivers the recommended content list 321 to the mobile terminal 310. As a result, the mobile terminal 310 generates an updated PIMS 312 as the recommended content list 321 is automatically reflected in the PIMS 311.

Thereafter, the set-top box 320 receives content corresponding to the recommended content list 321 from the service provider 330, and automatically delivers the received content to the mobile terminal 310. Here, the set-top box 320 transmits the content to the mobile terminal 310 through synchronization. In this way, the mobile terminal 310 may store the content in accordance with the user information, thereby providing the user with desired content at a time when the user can view the content, even during an outing.

Figure 4:
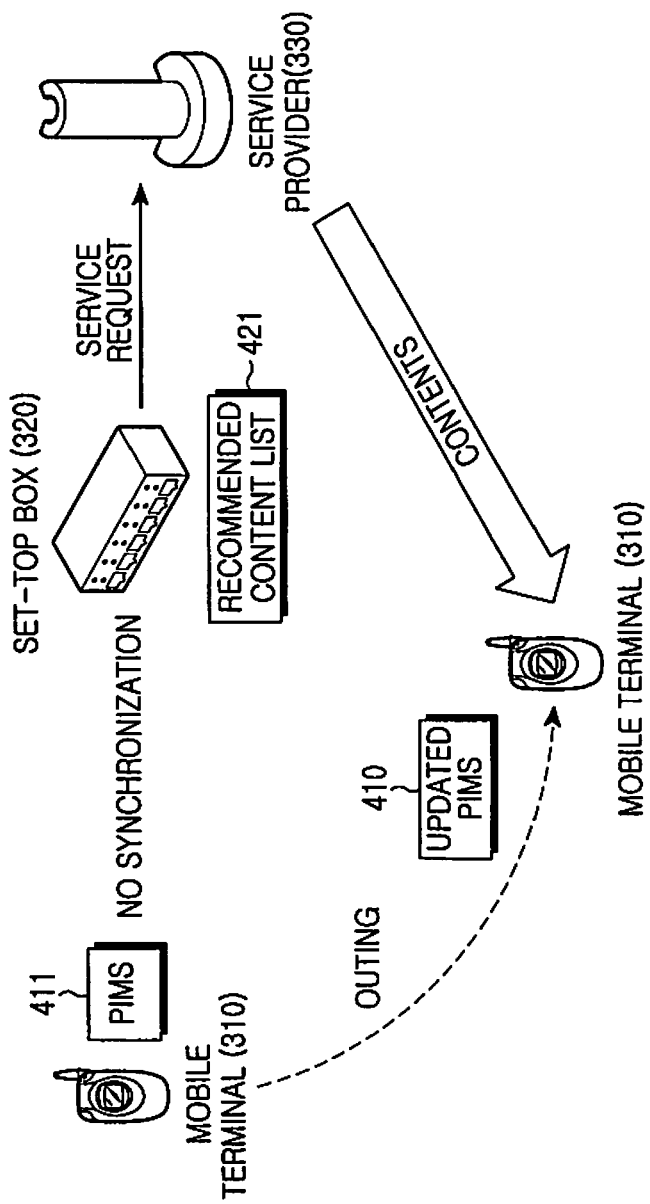
FIG. 4 is a diagram illustrating an operation of an IPTV system according to another embodiment of the present invention.

FIG. 4 is a diagram illustrating an operation of an IPTV system according to another embodiment of the present invention.

In the example of FIG. 4, a user does not personally perform synchronization. The elements of the IPTV system illustrated in FIG. 4 are equivalent to corresponding elements in the IPTV system illustrated in FIG. 3.

Referring to FIG. 4, in the IPTV system, when the user fails to perform synchronization and a timer has been updated through a synchronization timer, the set-top box 320 determines that the user has not performed synchronization. Then the set-top box 320 creates a recommended content list 421 using the most recently gathered user information, and transmits a request for the service provider 330 to directly provide services to the mobile terminal 310. In this case, the service provider 330 directly delivers the recommended content list received from the set-top box 320 to the mobile terminal 310 over a public network, and transmits the content at a specified time. During operations between the mobile terminal 310 and the service provider 330, the service provider 330 may further perform operations of the mobile terminal 310 and the set-top box 320 described in FIG. 3, in addition to the operation of providing the content.

Figures 5C, 6:
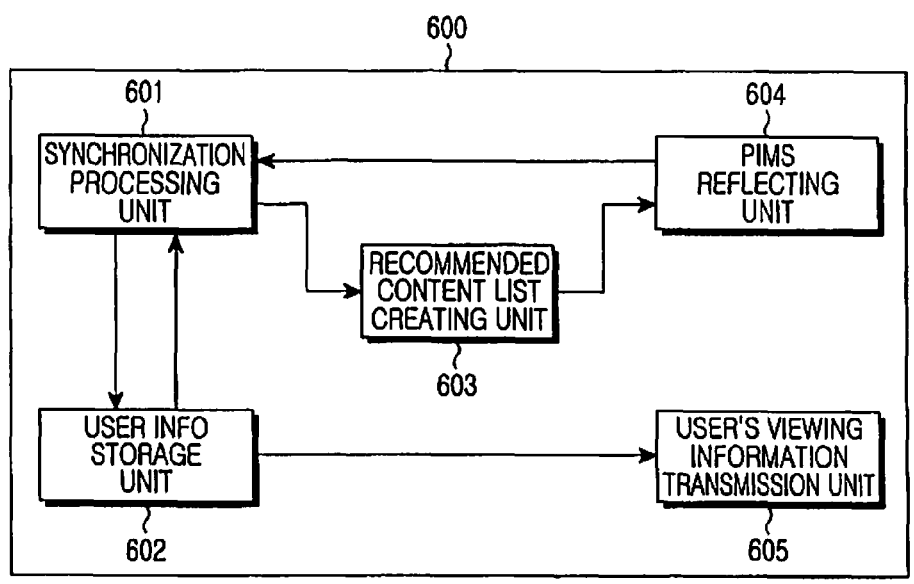

FIGS. 5A to 5C illustrate a change in PIMS according to an embodiment of the present invention, in which a schedule of a college student is shown.

A PIMS 501 in FIG. 5A is personally input by a user. The PIMS 501 is delivered to the set-top box 320 for synchronization, and the set-top box 320 creates a recommended content list 502 of FIG. 5B based on the user's PIMS considering user information.

In the example FIG. 5B, animation and world news programs are scheduled as recommended content at 12:00 on Monday and Tuesday that the user can watch after the lecture. On Wednesday and Thursday, English conversation programs are scheduled in consideration of a commute time to a part-time job so that the user can receive the content while on the move. In addition, tour information content and a road movie program are scheduled on Saturday in the recommended content list 502 so that the user can get information on a destination of the scheduled tour and watch the road movie while the user is traveling.

The recommended content list 502 is delivered to the mobile terminal 310, and the mobile terminal 310 creates a PIMS 503 of FIG. 5C by combining the recommended content list 502 with the PIMS 501. Such a process is automatically performed during the synchronization operation, and with intervention of the user, some content in the recommended content list 502 may not be received by the mobile terminal 310 or may be changed according to a user's selection.

When content recommended for Monday is not selected by the user, deletion of the content is reflected in the updated PIMS 503 shown in FIG. 5C.

FIG. 6 is a block diagram of a set-top box for providing broadcast content in an IPTV system according to an embodiment of the present invention.

The set-top box 320 according to an embodiment of the present invention includes a My Diary service providing unit 600. The My Diary service providing unit 600 includes a synchronization processing unit 601, a user information storage unit 602, a recommended content list creating unit 603, a PIMS reflecting unit 604, and a user's viewing information transmission unit 605.

The synchronization processing unit 601, a function unit for performing synchronization with the mobile terminal 310, receives the PIMS 311 and viewing pattern information input by a user, and delivers the recommended content list 321 to the mobile terminal 310 so that the mobile terminal 310 may update the PIMS 311 and create the updated PIMS 312. Further, the synchronization processing unit 601 provides an external interface for receiving content from the service provider 330 (the content receiving function is a known function of the set-top box) so that the mobile terminal 310 may store received content.

The user information storage unit 602 stores user information, including the PIMS 312, and a user's taste, viewing pattern and log information.

The recommended content list creating unit 603 provides an interface for receiving an EPG from the service provider 330 (the EPG receiving function is a known function of the set-top box) in an attempt to select recommended content from among all content using the EPG received from the service provider 330 and the user information stored in the user information storage unit 602.

The PIMS reflecting unit 604 performs an operation of expressing the selected recommended content in the form of the user's PIMS and also performs a function of packaging related information together.

Table 1 below shows examples of the information delivered to the mobile terminal 310 through the PIMS reflecting unit 604 based on embodiments of FIGS. 5A to 5C.

The mobile terminal 310, according to an embodiment of the present invention, includes a My Diary service receiving unit 700. The My Diary service receiving unit 700 includes a PIMS management unit 701, a synchronization processing unit 702, an application driving unit 703, and a viewing information recording unit 704.

The PIMS management unit 701, which provides a PIMS application and an interface in the mobile terminal 310, delivers a PIMS, input by a user, to the synchronization processing unit 702, and updates the PIMS using a recommended content list and user information received from the synchronization processing unit 702.

The synchronization processing unit 702 delivers PIMS information to the set-top box 320 or the service provider 330, and/or receives the recommended content list from the set-top box 320 or the service provider 330 in cooperation with the PIMS management unit 701. Further, the synchronization processing unit 702 performs a function of delivering content viewing information stored in the viewing information recording unit 704 to the set-top box 320.

The application driving unit 703 runs an application for content viewing, such as opening a pop-up window at a specified time based on a schedule stored in the PIMS. Further, the application driving unit 703 inquires whether the user will directly receive the content the service provider 330 provides.

The viewing information recording unit 704 records viewing information of the content that the user has watched, and delivers the recorded viewing information to the synchronization processing unit 702.

Figure 8:
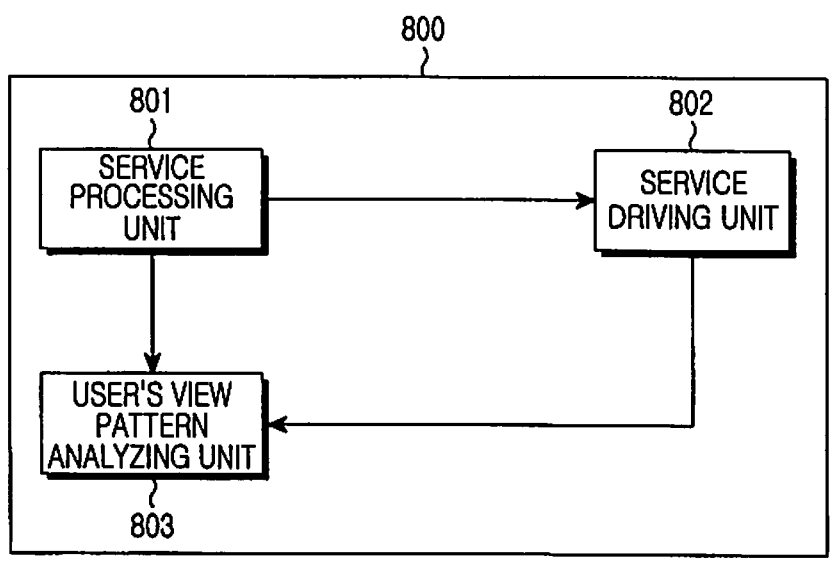
FIG. 8 is a block diagram of a service provider for providing broadcast content in an IPTV system according to an embodiment of the present invention.

FIG. 8 is a block diagram of a service provider for providing broadcast content in an IPTV system according to an embodiment of the present invention.

The service provider 330, according to an embodiment of the present invention, includes a My Diary service providing unit 800. The My Diary service providing unit 800 includes a service processing unit 801, a service driving unit 802, and a user's viewing pattern analyzing unit 803.

The service processing unit 801 remotely receives a request for a My Diary service from the set-top box 320 of a user who has not performed synchronization. That is, the service processing unit 801 receives from the set-top box 320 a recommended content list it will deliver to the user so that the user can receive services directly from the service provider 330 without passing through the set-top box 320. The

TABLE 1

| | | | | Last synchronized date/time: 2008/03/27 00:00 | | |
|---|---|---|---|---|---|---|
| Owner: unidentified | | Set-top box ID: A | | | Additional | |
| Content ID | Description | Start time | Running time | Content information | content information | SP ID |
| Naruto | Animation, synopsis | Monday 12:20 | 40 min | Encoding method, language, etc. | Related goods, club URL, etc | OCN |
| The Quest of Three Kingdoms | Movie, synopsis | Wednesday 12:30 | 120 min | Encoding method, language, etc. | Related goods, club URL, etc | Super-action |
| ... | ... | ... | ... | ... | ... | ... |

Figure 7:
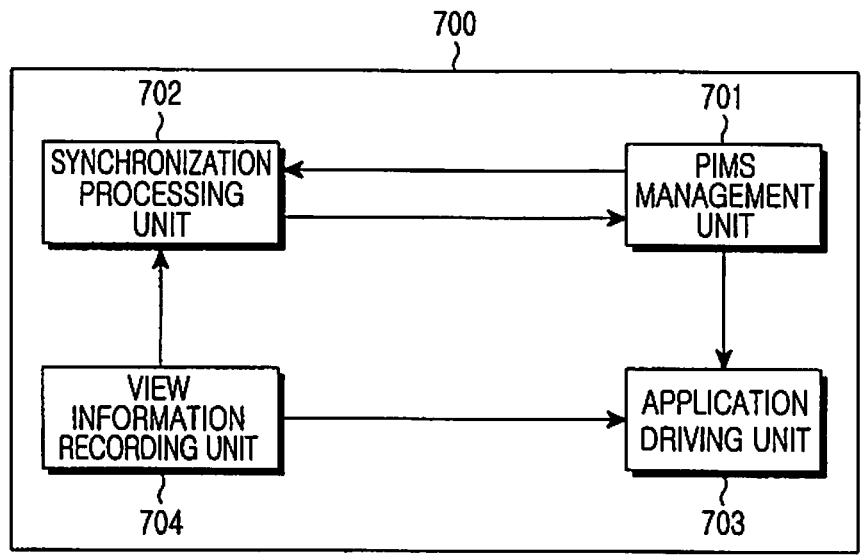
FIG. 7 is a block diagram of a mobile terminal for providing broadcast content in an IPTV system according to an embodiment of the present invention.

FIG. 7 is a block diagram of a mobile terminal for providing broadcast content in an IPTV system according to an embodiment of the present invention.

service processing unit 801 delivers the recommended content list to the mobile terminal 310. Further, the service processing unit 801 receives the user's content log information from the set-top box 320 and delivers the received content log information to the user's viewing pattern analyzing unit 803.

The service driving unit 802 delivers content to the mobile terminal 310 at a specified time based on a recommended content list of each user, received from the service processing unit 801. The service driving unit 802 provides an interface with a content transmission unit. Since the content transmission unit corresponds to a known function of the service provider 330, a description of the content transmission unit is omitted herein. Further, the service driving unit 802 delivers log information to the user's viewing pattern analyzing unit 803 when the user accepts content for viewing.

The user's viewing pattern analyzing unit 803 stores log information of each user, and analyzes viewing patterns classified according to a user's sex, age, job, viewing time, etc., using the stored log information.

Figure 9:
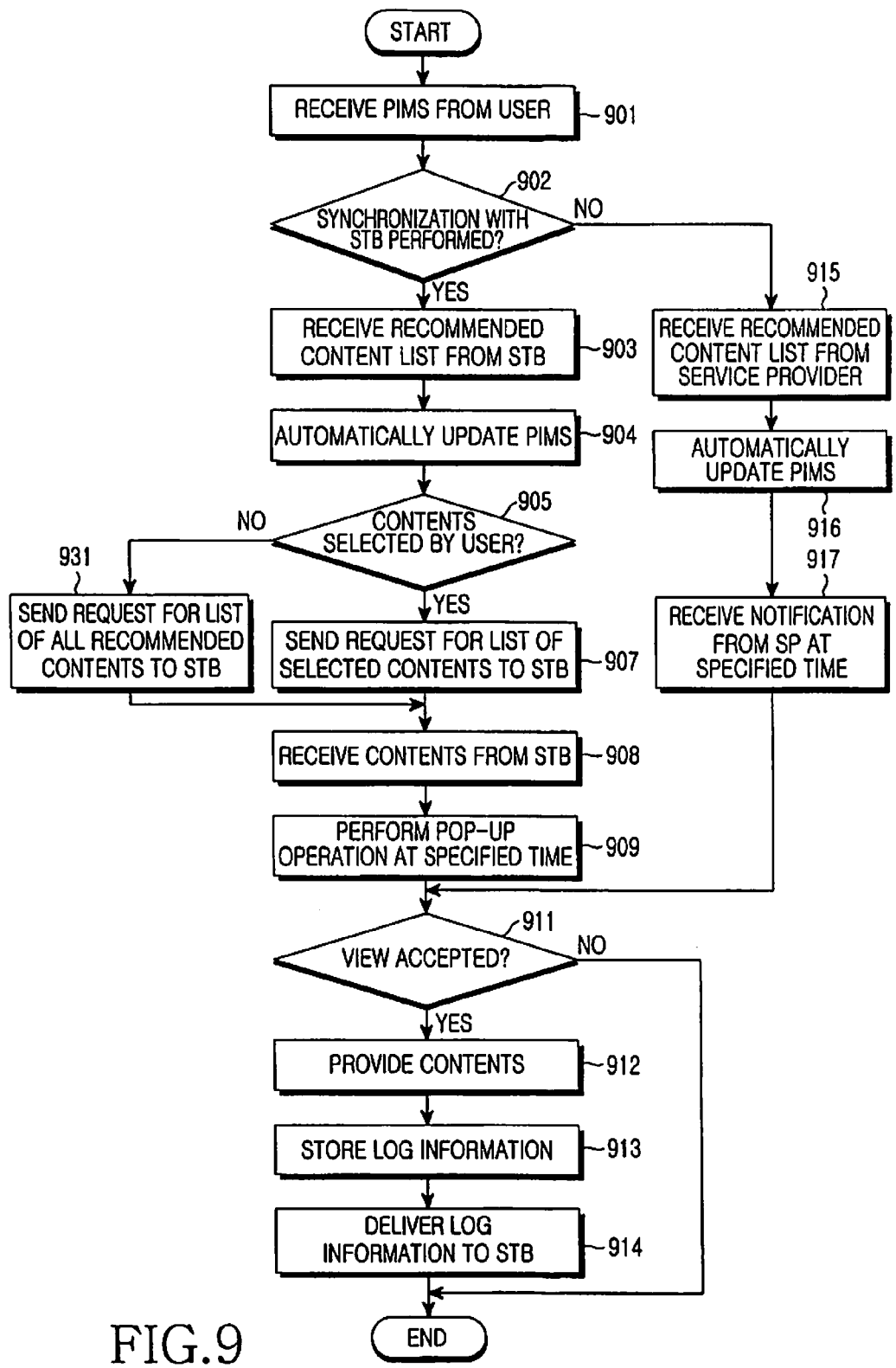
FIG. 9 is a flowchart illustrating a method for providing broadcast content in a mobile terminal according to an embodiment of the present invention.

FIG. 9 is a flowchart illustrating a method for providing broadcast content in a mobile terminal according to an embodiment of the present invention.

In step 901, the mobile terminal 310 receives the PIMS 311 from a user. In step 902, the mobile terminal 310 determines whether it has performed synchronization with the set-top box 320. If it has performed synchronization, the mobile terminal 310 receives the recommended content list 321 from the set-top box 320 in step 903.

In step 904, the mobile terminal 310 automatically updates the PIMS 311 by reflecting the received recommended content list 321 in the PIMS 311.

In step 905, the mobile terminal 310 determines whether the user has selected content from the recommended content list 321. The mobile terminal 310 proceeds to step 931 when the user has not selected content, and proceeds to step 907 when the user has selected content.

In step 931, the mobile terminal 310 sends a delivery request for a list of all recommended content to the set-top box 320. However, in step 907, the mobile terminal 310 sends a delivery request for a list of only the selected content to the set-top box 320.

In step 908, the mobile terminal 310 receives content in the requested content list from the set-top box 320. When there is a large number of content types and quantity, only the content selected by the user's settings (e.g., the mobile terminal 310 may be set to receive content for the past two days) can be provided from the set-top box 320 to the mobile terminal 310.

In step 909, at a start time of the received content, the mobile terminal 310 informs the user of a start of the content in a pop-up manner, or the like, for recognition by the user.

In step 911, the mobile terminal 310 determines whether the user has accepted the viewing of the content. The mobile terminal 310 proceeds to step 912 when the user has accepted the viewing, and ends the content providing process when the user has not accepted the viewing.

The mobile terminal 310 provides the content to the user in step 912, and stores log information in step 913. In step 914, the mobile terminal 310 delivers the log information to the set-top box 320, when the user again performs synchronization with the set-top box 320 at home.

When the mobile terminal 310 has not performed synchronization with the set-top box 320 in step 902, the mobile terminal 310 directly receives a recommended content list from the service provider 330 in step 915, and automatically updates the PIMS 311 with the recommended content list in step 916. Thereafter, in step 917, the mobile terminal 310 receives a notification message notifying a broadcast start from the service provider 330 at a broadcast start time.

Figure 10:
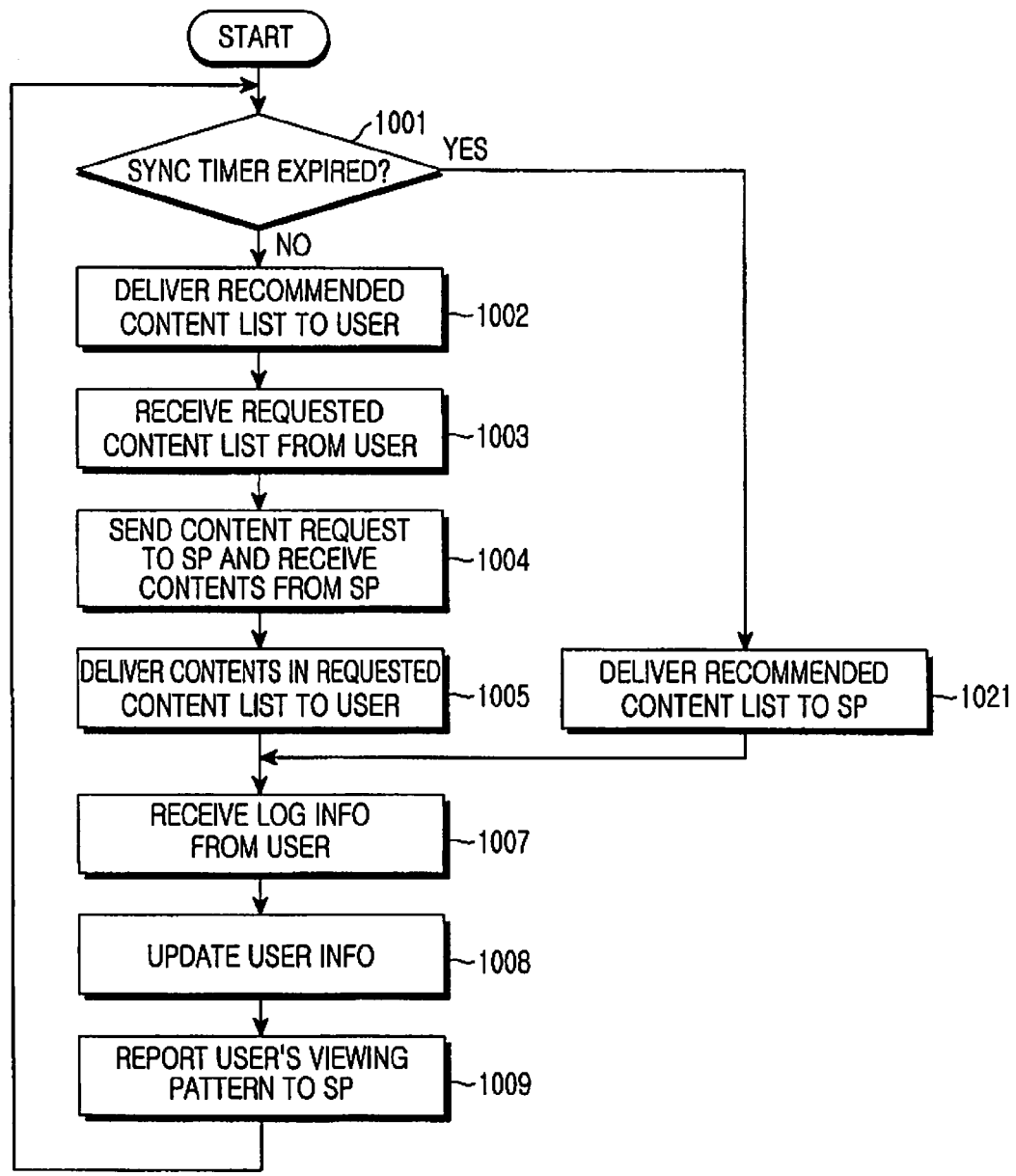
FIG. 10 is a flowchart illustrating a method for providing broadcast content in a set-top box according to an embodiment of the present invention.

FIG. 10 is a flowchart illustrating a method for providing broadcast content in a set-top box according to an embodiment of the present invention.

In step 1001, the set-top box 320 starts a synchronization timer to check whether its synchronization with the mobile terminal 310 has been performed. When the synchronization has been performed within the time set in the synchronization timer, the timer is updated. In step 1002, the set-top box 320 delivers the recommended content list 321 to the user through the mobile terminal 310.

Upon receiving a requested content list from the user in step 1003, the set-top box 320 sends a request for the requested content to the service provider 330 and receives the requested content from the service provider 330 in step 1004.

In step 1005, the set-top box 320 delivers the received content to the user through the mobile terminal 310.

However, if the synchronization with the mobile terminal 310 has not been performed within the time set in the timer in step 1001, the set-top box 320 delivers the recommended content list 321 to the service provider 330 in step 1021 so that the service provider 330 may directly provide the content to the mobile terminal 310.

Thereafter, in step 1007, the set-top box 320 receives the user's log information when the mobile terminal 310 performs synchronization again. In step 1008, the set-top box 320 updates user information according to the user's log information so that the updated user information can be reflected in the recommended content list it will make next.

In step 1009, the set-top box 320 delivers the user information to the service provider 330 so that the service provider 330 may use the user information in performing audience rating surveys, personalized advertisements, and the like.

Figure 11:
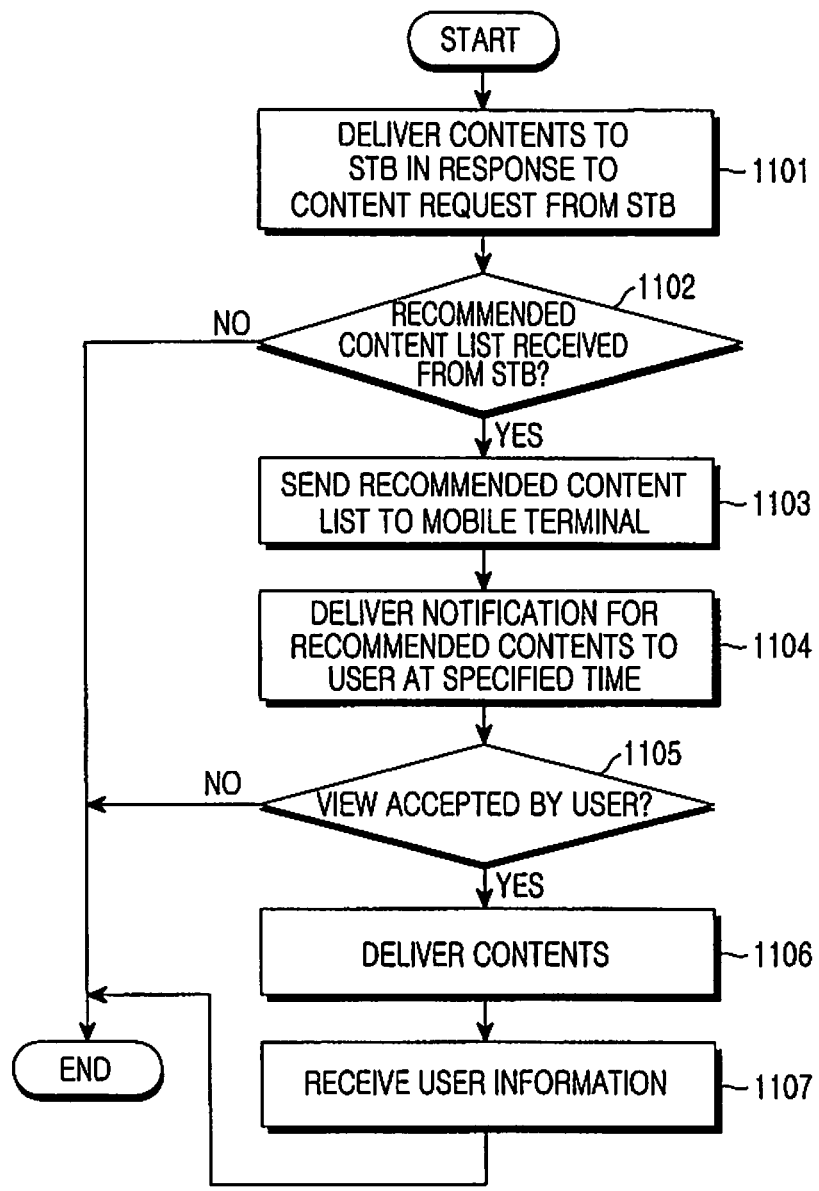
FIG. 11 is a flowchart illustrating a method for performing broadcast content in a service provider according to an embodiment of the present invention.

FIG. 11 is a flowchart illustrating a method for performing broadcast content in a service provider according to an embodiment of the present invention.

In step 1101, upon receipt of a request for content from the set-top box 320, the service provider 330 delivers the requested content to the set-top box 320.

In step 1102, the service provider 330 determines whether it has received the recommended content list 321 from the set-top box 320. If the service provider 330 has received the recommended content list 321 from the set-top box 320, the service provider 330 transmits the recommended content list 321 to the mobile terminal 310 in step 1103. On the contrary, when the service provider 330 has failed to receive the recommended content list 321 from the set-top box 320 in step 1102, the service provider 330 terminates the broadcast content providing process.

Thereafter, in step 1104, the service provider 330 delivers a notification message notifying the user at a broadcast start time of the content corresponding to the recommended content list 321.

In step 1105, the service provider 330 determines whether the user has accepted viewing of the content through the mobile terminal 310. If the user has accepted viewing, the service provider 330 provides the content to the mobile terminal 310 in step 1106. However, if the user has not accepted viewing in step 1105, the service provider 330 terminates the broadcast content providing process.

Thereafter, in step 1107, the service provider 330 receives user information from the set-top box 320 and uses it for an audience rating survey, personalized advertisement, and the like.

Figure 12:
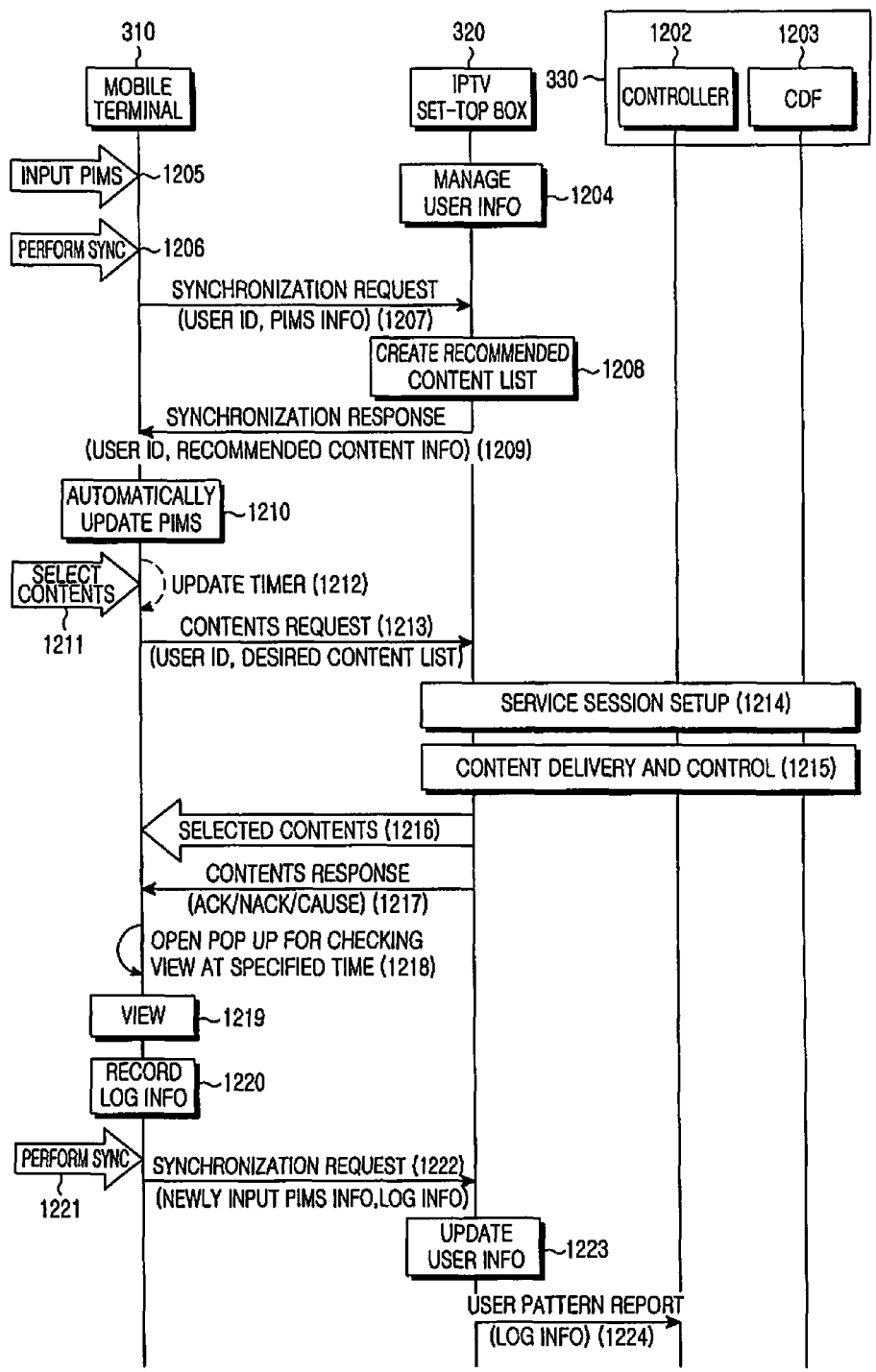
FIG. 12 is a flow diagram illustrating a method for providing broadcast content in an IPTV system according to an embodiment of the present invention.

FIG. 12 is a flow diagram illustrating a method for providing broadcast content in an IPTV system according to an embodiment of the present invention.

Referring to FIG. 12, major elements of an IPTV system according to an embodiment of the present invention include the mobile terminal 310, the set-top box 320, and the service provider 330. The service provider 330 includes an IPTV controller 1202 and a Content Delivery Function Unit (CDF) 1203. The set-top box 320, a gateway for providing IPTV services at home, is an IPTV set-top box, and the IPTV set-top box additionally includes a function for interworking with an IPTV network.

The IPTV controller 1202 included in the service provider 330, which is a core element for providing IPTV services, performs user authentication and charging, and session management. The CDF 1203 is a server that takes charge of data processing and delivering. That is, the IPTV controller 1202 and the CDF 1203 are elements that are included in a domain of the service provider 330 and provide physical or logical functions. A detailed description thereof is omitted for clarity and conciseness.

In step 1204, the set-top box 320 manages user information it received from the mobile terminal 310 in advance.

When the mobile terminal 310 directly receives a PIMS from a user in step 1205, the mobile terminal 310 performs synchronization in step 1206. After the synchronization, the mobile terminal 310 sends a Synchronization Request message with a user ID and PIMS information to the set-top box 320 in step 1207.

Upon receipt of the Synchronization Request message, the set-top box 320 creates a recommended content list based on the user information and an EPG in step 1208, and sends a Synchronization Response message including the user ID and the recommended content list to the mobile terminal 310 in step 1209. In step 1210, the mobile terminal 310 automatically updates the PIMS according to the recommended content list received in step 1209. In step 1211, the user may choose the content he/she desires to directly receive by checking the updated PIMS, and the mobile terminal 310 starts a timer and waits until content is selected by the user. When no content is selected by the user when the timer expires, the timer is updated in step 1212, considering that the mobile terminal 310 is to receive all recommended content. In step 1213, the mobile terminal 310 sends to the IPTV set-top box 320 a Content Request message that includes the user ID and a list of the content it intends to receive.

When the set-top box 320, which has received the Content Request message, sends a request for Service Session and Content Delivery to the service provider 330 through the IPTV controller 1202, a Service Session connecting the set-top box 320 to the CDF 1203 is set up in step 1214, and a Content Delivery and Control procedure is performed in step 1215. Detailed descriptions of steps 1214 and 1215 are not provided herein.

The set-top box 320 receives the content requested by the mobile terminal 310 through steps 1214 and 1215, and delivers the received content to the mobile terminal 310 in step 1216. After completion of the content delivery, the IPTV set-top box 320 sends a Content Response message including the content delivery result to the mobile terminal 310 in step 1217, notifying the user of service completion. Herein, the process of steps 1207 to 1217 is automatically performed through synchronization, and step 1211 may be added at user's option.

In step 1218, the mobile terminal 310 opens a pop-up window inquiring whether the user will view the content at a time the content is to start based on the updated PIMS. In step 1219, the mobile terminal 310 provides the content to the user upon receiving view acceptance information from the user. In step 1220, the mobile terminal 310 automatically stores the user's log information.

When the mobile terminal 310 receives a request for synchronization from the user again in step 1221, the mobile terminal 310 sends a Synchronization Request message including the log information and PIMS information newly input by the user, to the set-top box 320 in step 1222.

In step 1223, the set-top box 320 updates user information based on the log information and the PIMS information newly input by the user, both included in the Synchronization Request message. In step 1224, the set-top box 320 sends a User Pattern Report message including the log information to the IPTV controller 1202.

Figure 13:
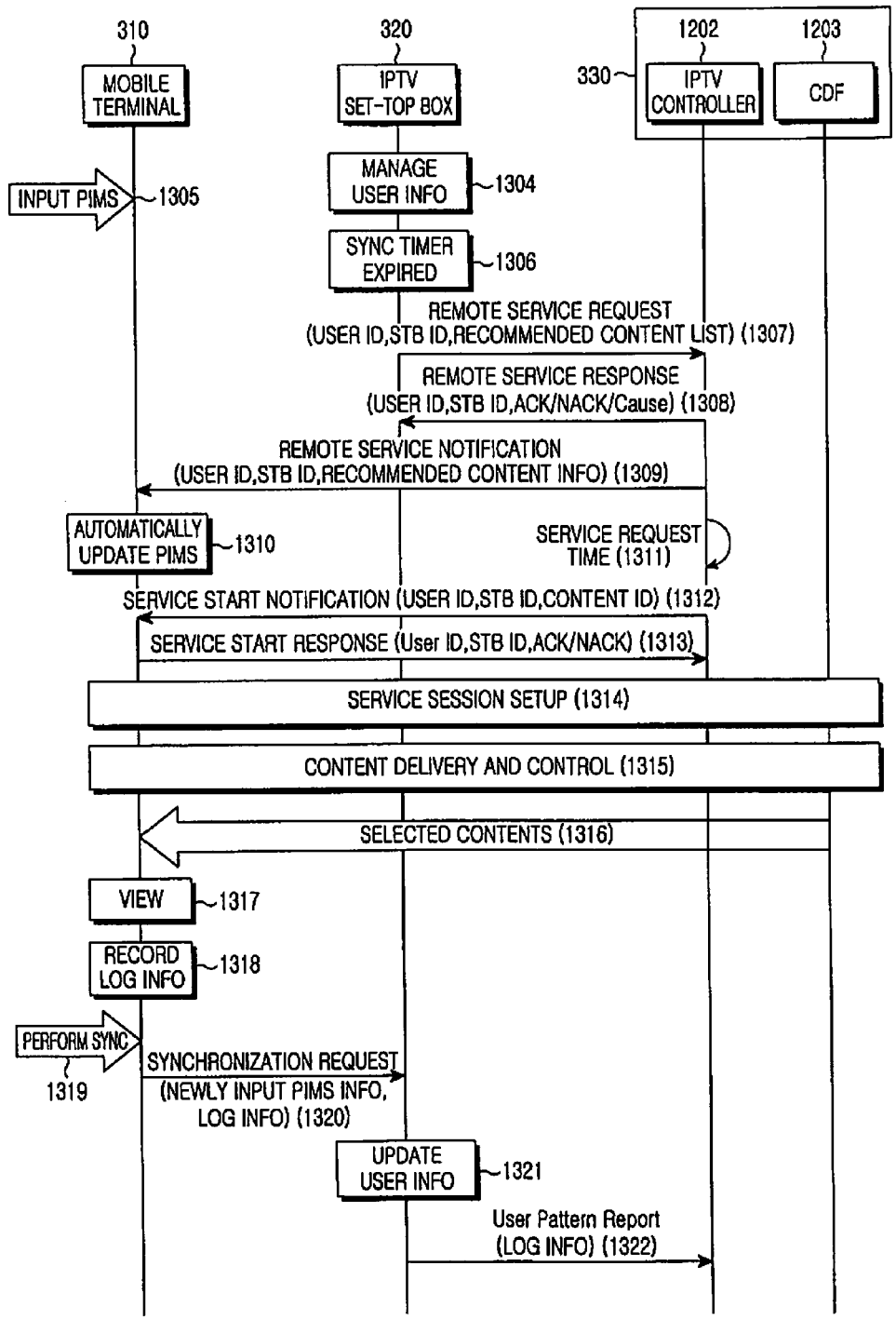
FIG. 13 is a flow diagram illustrating a method for providing broadcast content in an IPTV system according to another embodiment of the present invention.

FIG. 13 is a flow diagram illustrating a method for providing broadcast content in an IPTV system according to another embodiment of the present invention.

Referring to FIG. 13, the set-top box 320 manages user information received in advance from a user in step 1304, and the mobile terminal 310 directly receives a PIMS from the user in step 1305.

In step 1306, the set-top box 320 starts a synchronization timer, and updates the synchronization timer when it expires, determining that the user has not performed synchronization.

In step 1307, the set-top box 320 sends a Remote Service Request message including a user ID, a set-top box ID and a recommended content list to the IPTV controller 1202 in order to request a My Diary service at a remote location.

Upon receipt of the Remote Service Request message, the IPTV controller 1202 sends, in step 1308, a Remote Service Response message including a user ID, a set-top box ID and a reception result of the Remote Service Request message, to the set-top box 320 after authenticating the set-top box 320 and the user, thereby accepting the service request. A description of the authentication processes is omitted herein.

In step 1309, the IPTV controller 1202 directly sends a Remote Service Notification message a user ID, a set-top box ID and a recommended content list, to the mobile terminal 310. Upon receipt of the Remote Service Notification message, the mobile terminal 310 automatically updates the PIMS in step 1310.

In step 1311, the IPTV controller 1202 is monitoring a time for which specified content should be delivered. In step 1312, the IPTV controller 1202 sends a Service Start Notification message including a user ID, a set-top box ID and a content ID to the mobile terminal 310 at the specified time.

Upon receipt of the Service Start Notification message, the mobile terminal 310 sends, in step 1313, a Service Start Response message to the IPTV controller 1202, indicating whether the user will view the content. The Service Start Response message includes a user ID, a set-top box ID and a reception result of the Service Start Notification message. The IPTV controller 1202 performs a Service Session Setup process in step 1314, and a Content Delivery and Control process in step 1315, and delivers the content to the mobile terminal 310 in step 1316.

In step 1317, the mobile terminal 310 provides content to the user when the user accepts the viewing of the content. In step 1318, the mobile terminal 310 automatically stores the user's log information.

When the mobile terminal 310 receives a request for synchronization from the user again in step 1319, the mobile terminal 310 sends a Synchronization Request message including the log information and PIMS information newly input by the user, to the set-top box 320 in step 1320.

Upon receipt of the Synchronization Request message, the set-top box 320 updates, in step 1321, user information based on the log information and the PIMS information newly input by the user, both included in the Synchronization Request message. In step 1322, the set-top box 320 sends a User Pattern Report message including the log information to the IPTV controller 1202.

Tables 2 to 5 below show the messages exchanged between the mobile terminal 310 and the set-top box 320.

TABLE 2

Synchronization Request

| User ID | User identifier | ... |
|---|---|---|
| Device ID | Terminal identifier | ... |
| PIMS | User schedule information | ... |
| STB ID | Set-top box identifier | ... |
| Log info. | Content log information of user | ... |

TABLE 3

Synchronization Response

| User ID | User identifier | ... |
|---|---|---|
| Device ID | Terminal identifier | ... |
| STB ID | Set-top box identifier | ... |
| Recommended Content List | List of recommended content | ... |

TABLE 4

Content Request

| User ID | User identifier | ... |
|---|---|---|
| Device ID | Terminal identifier | ... |
| STB ID | Set-top box identifier | ... |
| Selected Content List | List of selected content | ... |

TABLE 5

Content Response

| User ID | User identifier | ... |
|---|---|---|
| Device ID | Terminal identifier | ... |
| STB ID | Set-top box identifier | ... |
| Result | Result on content delivery, and cause upon delivery failure | ... |

Tables 6 to 8 below show the messages exchanged between the set-top box 320 and the service provider 330.

TABLE 6

User Pattern Report

| User ID | User identifier | ... |
|---|---|---|
| Device ID | Terminal identifier | ... |
| STB ID | Set-top box identifier | ... |
| SP ID | Service provider identifier | ... |
| Log info. | Content log information of user | ... |

TABLE 7

Remote Service Request

| User ID | User identifier | ... |
|---|---|---|
| Device ID | Terminal identifier | ... |
| STB ID | Set-top box identifier | ... |

TABLE 7-continued

Remote Service Request

| SP ID | Service provider identifier | ... |
|---|---|---|
| Recommended Content List | Information about recommended content | ... |

TABLE 8

Content Response

| User ID | User identifier | ... |
|---|---|---|
| Device ID | Terminal identifier | ... |
| STB ID | Set-top box identifier | ... |
| SP ID | Service provider identifier | ... |
| Result | Result on content delivery, and cause upon delivery failure | ... |

Tables 9 to 11 below show the messages exchanged between the service provider 330 and the mobile terminal 310.

TABLE 9

Remote Service Notification

| User ID | User identifier | ... |
|---|---|---|
| Device ID | Terminal identifier | ... |
| STB ID | Set-top box identifier | ... |
| SP ID | Service provider identifier | ... |
| Recommended Content List | Information about recommended content | ... |

TABLE 10

Service Start Notification

| User ID | User identifier | ... |
|---|---|---|
| Device ID | Terminal identifier | ... |
| STB ID | Set-top box identifier | ... |
| SP ID | Service provider identifier | ... |
| Content ID | Identifier of content delivered to user | ... |

TABLE 11

Service Start Response

| User ID | User identifier | ... |
|---|---|---|
| Device ID | Terminal identifier | ... |
| STB ID | Set-top box identifier | ... |
| SP ID | Service provider identifier | ... |
| ACK/NACK | Acknowledgement of content | ... |

Embodiments of the present invention can also be embodied as computer-readable codes on a computer-readable recording medium. The computer-readable recording medium is any data storage device that can store data, which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

As is apparent from the foregoing description, the present invention can create recommended content using user information-based patterns and automatically store the recommended content in the user's mobile terminal without intervention of the user, so that the user can receive IPTV services in an outdoor environment without a separate procedure.

In addition, because the service provider can gather user information, the service provider may accurately analyze its target markets based on the user information, thus making an additional profit through personalized advertisement services, and the like.

While the invention has been shown and described with reference to a certain preferred embodiments thereof, it will be understood by those skilled in the art that various changes in form and details may be made therein without departing from the spirit and scope of the invention as defined by the appended claims and their equivalents.

What is claimed is:

1. A method for providing content in a broadcast system, the method comprising the steps of:
   receiving, by a set-top box, a request for synchronization from a mobile terminal, the request including personal information management system (PIMS) information having a user's schedule included in user information;
   creating, by the set-top box, a first recommended content list comprising content that is scheduled at times that do not conflict with existing entries in the received user's schedule, and delivering the first recommended content list to the mobile terminal;
   receiving, by the set-top box, from the mobile terminal, a content list, selected from updated PIMS information, which is updated based on the first recommended content list;
   sending, by the set-top box, a request for the content to a service provider, receiving the requested content from the service provider when a user of the mobile terminal accepts viewing content included in the received content list, and providing the received content to the mobile terminal; and
   upon failure to receive the request for synchronization from the mobile terminal during a predetermined time, creating, by the set-top box, a second recommended content list using a last gathered user's schedule and sending a request for at least one content which is related to the second recommended content list to the service provider.

2. The method of claim 1, wherein the user information further comprises a taste and a viewing pattern of the user.

3. The method of claim 1, further comprising:
   after providing the received content to the mobile terminal, updating, by the set-top box, the user information depending on the received content.

4. The method of claim 1, further comprising:
   after delivering the second recommended content list to the service provider,
   determining, by the service provider, whether the user of the mobile terminal intends to view content included in the second recommended content list; and
   upon receipt of view acceptance information at the service provider from the mobile terminal, providing the content from the service provider to the mobile terminal.

5. A method for providing content in a broadcast system, the method comprising the steps of:
   sending, by a mobile terminal, a request for synchronization to a set-top box, the request including personal information management system (PIMS) information having a user's schedule included in user information;
   receiving, by the mobile terminal, a first recommended content list, and updating the PIMS information based on the first recommended content list, wherein the first recommended content list comprises content that is scheduled at times that do not conflict with existing entries in the user's schedule and is created by the set-top box;
   delivering, by the mobile terminal, a content list, selected from the updated PIMS information, to the set-top box;
   receiving, by the mobile terminal, a view inquiry message for content included in the content list, from the set-top box, and delivering information, to the set top box, indicating whether the user intends to view the content;
   receiving, by the mobile terminal, the content provided from a service provider according to a user's intention; and
   receiving, by the mobile terminal, at least one content which is related to a second recommended content list created based on a last gathered user's schedule from the service provider, upon failure to receive the request for synchronization from the user during a predetermined synchronization time.

6. The method of claim 5, wherein the user information further comprises a taste and a viewing pattern of the user.

7. The method of claim 5, further comprising:
   delivering, by the mobile terminal, a list of all content included in the updated PIMS information to the set-top box, when the mobile terminal fails to receive, after a predetermined time, a list of content that the user selected from the content included in the updated PIMS information.

8. An apparatus for providing content in a broadcast system, the apparatus comprising:
   a set-top box for receiving a request for synchronization from a mobile terminal, the request including personal information management system (PIMS) information having a user's schedule included in user information, creating a first recommended content list comprising content that is scheduled at times that do not conflict with existing entries in the received user's schedule, delivering the first recommended content list to the mobile terminal, receiving from the mobile terminal a content list, selected from updated PIMS information, which is updated based on the first recommended content list, and sending a request for the content to a service provider when a user of the mobile terminal accepts viewing the content included in the received content list,
   wherein upon failure to receive the request for synchronization from the mobile terminal during a predetermined time, the set-top box creates a second recommended content list using a last gathered user's schedule and sends a request for at least one content which is related to the second recommended content list to the service provider.

9. The apparatus of claim 8, wherein the user information further comprises a taste and a viewing pattern of the user.

10. The apparatus of claim 8, wherein the set-top box delivers the content to the mobile terminal, and updates the user information depending on the content.

11. The apparatus of claim 8, wherein the service provider determines whether the user of the mobile terminal intends to view content from the second recommended content list, and upon receipt of view acceptance information from the mobile terminal, provides the content to the mobile terminal.

12. An apparatus for providing content in a broadcast system, the apparatus comprising:

a personal information management system (PIMS) management unit for receiving, from a set top box, a first recommended content list, and updating the PIMS information based on the first recommended content list, after sending a request for synchronization to the set-top box, wherein the first recommended content list comprises content that is scheduled at times that do not conflict with existing entries in a user's schedule included in user information and is created by the set-top box;

an application driving unit for receiving, from the set-top box, a view inquiry message for content included in a content list, selected from the updated PIMS information; and a synchronization processing unit for delivering a content list to the set-top box, delivering information indicating whether the user intends to view the content, to the set-top box, and receiving the content provided from the service provider according to a user's intent, wherein the synchronization processing unit receives at least one content which is related to a second recommended content list created based on a last gathered user's schedule from the service provider upon failure to receive the request for synchronization from the user during a predetermined synchronization time.

13. The apparatus of claim 12, wherein the user information further comprises a taste and a viewing pattern of the user.

14. The apparatus of claim 12, wherein the synchronization processing unit delivers a list of all content included in the updated PIMS information to the set-top box, when the mobile terminal fails to receive, after a predetermined time, a list of content that the user selected from the content included in the updated PIMS information.

* * * * *